US006741997B1

(12) United States Patent
Liu et al.

(10) Patent No.: US 6,741,997 B1
(45) Date of Patent: May 25, 2004

(54) INSTANTIATING OBJECTS IN DISTRIBUTED DATABASE SYSTEMS

(75) Inventors: Jing Liu, Pacifica, CA (US); Curtis A. Elsbernd, Belmont, CA (US); Mahesh Subramaniam, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 239 days.

(21) Appl. No.: 09/881,507

(22) Filed: Jun. 14, 2001

(51) Int. Cl.[7] .............................................. G06F 17/30
(52) U.S. Cl. ........................................ 707/102; 707/10
(58) Field of Search .............................. 707/1, 10, 100, 707/102, 103 R, 103 Y, 103 Z (56) References Cited

U.S. PATENT DOCUMENTS

| | | | | |
|---|---|---|---|---|
| 6,163,776 | A | * 12/2000 | Periwal ........................... | 707/4 |
| 6,591,272 | B1 | * 7/2003 | Williams ..................... | 707/102 |
| 2002/0143727 | A1 | * 10/2002 | Hu et al. ....................... | 707/1 |

* cited by examiner

Primary Examiner—Diane D. Mizrahi
(74) Attorney, Agent, or Firm—Gordon E. Nelson (57) ABSTRACT

Techniques used in a distributed database system for simplifying copying of objects from one database system in the distributed database system to another and establishing the infrastructure necessary for the distributed system in the database systems. One application of the techniques is setting up a cache database system that has a subset of the objects in another database system and establishing a link for redirecting misses between the cache and the other database system. Also included is the infrastructure in the cache and the other database system for an authentication proxy that establishes sessions in the other database system for users to perform operations that have been redirected as a result of a miss in the cache. The techniques require only that the user supply simple descriptions of some of the objects to be copied; the techniques locate the necessary dependent objects and make objects for the infrastructure. Some of these are descriptions of the infrastructure objects that are copied to the cache and executed there and others are objects that are added directly to the other database system.

41 Claims, 5 Drawing Sheets

```
-- To create a template
          BEGIN
            :n := dbms_ias_template.create_ias_template(
                            owner =>'ias_owner',                         ─── 305
                            refresh_group_name => 'ias_refresh_group',   ─── 307
                            ias_template_name => 'ias_template',         ─── 309
                            template_comment => 'iAS template');
          END;
          /

-- To add a object to a template.
          BEGIN
            :n := dbms_ias_template.create_ias_object(
                            ias_template_name => 'ias_template',    ─── 313
                            object_name => 'ias_user',              ─── 315
                            object_type => 'USER');                 ─── 317
          END;
          /

BEGIN
            :n := dbms_ias_template.create_ias_object(
                            ias_template_name => 'ias_template',
                            object_name => 'user_table',
                            object_type => 'READ ONLY TABLE',       ─── 323
                            schema_name => 'ias_user');             ─── 325
          END;
          /
          BEGIN
            :n := dbms_ias_template.create_ias_object(
                            ias_template_name => 'ias_template',
                            object_name => 'tab1',
                            object_type => 'SYNCHRONOUS UPDATABLE TABLE',
                            schema_name => 'ias_user');
          END;                                                      ─── 327
          /

BEGIN
            :n := dbms_ias_template.create_ias_object(
                            ias_template_name => 'ias_template',
                            object_name => 'tempt',
                            object_type => 'TEMPORARY TABLE',
                            schema_name => 'ias_user');             ─── 329
          END;
          /
```

Labels: 303, 304, 305, 307, 309, 311, 312, 313, 315, 317, 319, 323, 325, 327, 329, 301

FIG. 3

```
                CONNECT ias_starter/ias_starter@inst1   405
                DECLARE
                BEGIN
             ⎧  dbms_ias_inst.start_ias_inst(
             ⎪          ias_template_name => 'ias_template',   407
     403    ⎨           authuser => 'ias_proxy',   409
             ⎪          authpw => 'ias_proxy',   411
             ⎩          connstr => 'inst1');   413
                END;
                /
                COMMIT;  415
```

FIG. 5

INSTANTIATING OBJECTS IN DISTRIBUTED DATABASE SYSTEMS

CROSS REFERENCES TO RELATED APPLICATIONS

The present patent application is being filed on even date with three other patent applications addressed to techniques for improving queryable caches. The present patent application is also related to pending U.S. Ser. No. 09/294,656, Cusson, et al., Web servers with queryable dynamic caches, filed Apr. 19, 1999 and to its PCT counterpart, PCT/US00/10516, which was published Oct. 26, 2000 as WO 00/63800. All of the related applications have a common assignee.

BACKGROUND OF THE INVENTION

1. Field of the Invention

The invention relates generally to techniques for making frequently-referenced data more available to programs using the data and more specifically to techniques for making distributed queryable caches of data that is contained in large databases. The caches are transparent to the program that is querying the large data base in that the program generally need not be altered when a cache is added.

2. Description of Related Art

Local and Remote Copies of Data

A common problem in data processing systems is that frequently-used data cannot be quickly accessed, either because there is not enough capacity in the connection between the processor and the data storage or because too many program executions are contending for access to the data storage. One way of solving the problem is to make a copy of the data and put the copy in a location where it is more accessible to some of the program executions that are using the data. Those program executions can then reference the copy of the data in the more accessible location rather than the original data. In the following, the more accessible copy will be called the local copy, while the less-accessible original will be called the remote copy. It is to be understood, of course, that the terms remote and local represent degrees of accessibility and that both copies may be physically in the same location.

The local copy may be a complete copy of the data or it may be only a partial copy; further, the local copy may or may not be transparent to the executing program. When the local copy is transparent, the executing program can refer to a data item in exactly the same fashion as it did before the local copy existed. The reference goes first to the local copy. If the data is there (this is termed a hit), the data is retrieved from the local copy. If the data is not there (this is termed a miss), the reference goes automatically to the remote copy and the data is retrieved from the remote copy. When the local copy is not transparent, the program must be changed to take into account the fact that references are made to the local copy, instead of to the remote copy. In general, local copies of remote data that are both partial and transparent to the executing program are termed caches. Transparence is a relative term. Though the executing program need in general not be modified when the cache is added, the presence of the cache may result in some differences in the program's behavior, and in some cases the differences in behavior may require modification of the program.

Whenever there are local and remote copies of data, the copies must be kept consistent with each other. This is easy only if the data never changes; if it does change, then changes in one of the copies must be propagated to others of the copies. In some cases, the local copy is read only; the programs using it cannot change it, but changes in the remote copy are propagated to the local copy. In other cases, the local copy is updateable, and when this is the case, the updates must be propagated to the remote copy. When the propagation is done depends on how consistent the copies must be. For example, if the copies can be inconsistent for a whole working day, changes need only be propagated once a day. On the other hand, if it is required that the copies are always consistent, any change must be propagated immediately.

Local and Remote Copies of Databases

Databases are organized collections of data in which sets of data items are accessed by queries. The query describes the set of data items to be accessed in terms of the database's organization. The most common kind of organization for databases is relational: the data is organized into tables with named columns and rows. Each row has a field for each of its columns. A field for a column in a row contains that row's value for the column. Values in the fields can serve to uniquely identify rows of the database and to relate rows in one table to rows in a different table. A set of data items contained in a relational database is specified in terms of rows and columns of the table the items are in and values in the row or rows that contain the items. The following Employees table offers a simple example:

| emp_id | emp_name | emp_pay |
|--------|----------|---------|
| 000001 | "Owner"  | $1,000,000 |
| ...    | ...      | ...     |
| 000999 | "Drudge" | $20,000 |

This table has three columns and a row for each employee. the emp_id field of an employee's row contains a unique identifier for the employee; the emp_name field contains the employee's name; the emp_pay field contains the employee's current pay.

Relational database systems use a language called SQL to specify data sets. An SQL request on a database describes an operation to be performed on a set of data in the database. The most common kind of request is a query, which describes an operation that reads the set of data. Other requests may modify the set of data or delete the set of data. For example, an SQL query to find out how much employee "Owner" makes might look like this:

SELECT emp_pay FROM Employees

WHERE emp_name="Owner"

This instructs the data base system to return the value of emp_pay from the row of the table Employees in which the field Emp_name has the value "Owner". The result of the query will be "$1,000,000". A database system contains not only the data, but also a description of the manner in which the data is organized. In the following, the description will be termed a data dictionary. Elsewhere, it may be termed the data base system's metadata or its schema.

Many organizations keep huge amounts of information in large central databases. As networks have grown, so has the potential for these large databases to be bottlenecks. The bigger the network, the more users, and the greater the problems caused by contention for the data base. Moreover, the network's carrying capacity is always less than the demands being made on it. As a result, it often takes a long time to transmit the query to the database, have the database perform the query, and have the results returned to the user.

The development of the World Wide Web has of course increased all of these problems enormously. The database that contains the catalog of a Web merchant is accessible to literally everyone who has a connection to the Internet, and delays in getting a response are not only unpleasant for the user, but bad for the Web merchant's business.

A common approach to solving bottlenecks caused by databases is by replicating the data base. As the name implies, a replicated data base has a copy at another location. When a set of replicated databases is set up, methods are specified for keeping the replications consistent. A replicated database may be a complete copy of the database it is a replication of, or a partial copy. In the latter case, the partial copy is termed a materialized view. A materialized view may be read only, in which case, it is kept consistent with the database it is a copy of, but cannot be updated by the user, or it may be updateable, in which case the data items in the materialized view may be updated and the updates are propagated to the database of which the materialized view is a copy. A replicated database system provided by Oracle Corporation, of Redwood Shores, Calif., USA, is described in detail in the document Oracle 8i Replication, available in May, 2001 at http://technet.oracle.com/doc/server.815/

A problem with materialized views is that they are not transparent to the application program. If the application program provides a query to the materialized view that specifies a set of data items that is not in the materialized view but is in the database the materialized view was replicated from, the query simply fails, and the application must attempt it again on the database the materialized view was replicated from. Materialized views are consequently typically used in situations where it is possible to completely predict what queries will be made from a given remote location. The database tables needed to answer those queries are included in the materialized view, and since a miss never occurs, the fact that the materialized view provides no support to an application that has experienced a miss is not a problem.

However, as networks expand and more and more people need access to databases to do their jobs or to purchase products, selecting the right materialized view becomes more and more difficult. Oracle Corporation has responded to this problem by developing the queryable database cache described in published PCT application WO 00/63800, Oracle Corporation, Web Servers with queryable dynamic caches, published 26 October 2000 and claiming priority from pending U.S. Ser. No. 09/294,656, Cusson, et al., Web servers with queryable dynamic caches, filed Apr. 19, 1999. The cache of WO 00/63800 is transparent. When an application program makes a query on the cache, the query goes to a data access layer, which provides the query to the cache. If the query misses, the data access layer redirects the query to a remote database. There is thus no need for the application to know anything about either the cache or the remote database.

Though the queryable cache described in WO 00/63800 does have the fundamental advantage of transparency to the application program, experience with the cache has revealed some areas where improvement is needed:

The queryable cache needs to be transparent not only to the application program, but also to the data access layer.

The queryable cache needs to handle SQL requests that reference stored procedures.

There needs to be an easy way of setting up the cache so that it has all of the copies of objects that it needs to function and also has the objects necessary to link the cache to the remote database system that it is a partial copy of.

There needs to be a way of making a user session to perform redirected operations in the remote database without requiring a password from the user to make the session.

The two-stage commit process used for transactions between distributed databases needs to be optimized for the situation where the transaction does not result in modifications to particular ones of the distributed databases.

It is an object of the invention disclosed herein to solve one or more of the foregoing problems. As will be described in more detail in the following, the problems have been solved in an implementation of the queryable cache which is based on Oracle's techniques for making replicated databases that contain materialized views.

SUMMARY OF THE INVENTION

Techniques that are used in distributed database systems to select copies of objects in one database system that are to be copied to another database system and to ensure that the database systems involved have the necessary infrastructure to operate as a distributed database system.

In one aspect, the techniques simplify the selection of objects to be copied. Selection is done at the highest level by having a user provide simple descriptions of objects. A template creator creates a template from the descriptions and an object selector receives the template and makes a list of objects from the template. The objects described the template belong to a schema associated with a user of the database system and the list includes the objects described in the template and other objects that belong to the schema and are dependent from a table object in the list that belongs to the schema. The user thus need know nothing about low-level object dependencies when specifying the objects to be copied. Further simplification is achieved by the fact that the object descriptions from which the objects are made include only the object's name, type, and schema. In particular, no DDL description of the object being copied is required.

In another aspect, the techniques simplify setting up the infrastructure required for a distributed database system. The object selector not only selects the objects to be copied, but also adds objects required for infrastructure such as links and authentication proxies to the database systems involved. With infrastructure for the database system that is receiving the copies, the object selector makes an object that has a DDL description of the infrastructure and includes it in the list of objects to be copied; with infrastructure for the data base system that is the source of the copies, the object selector adds the necessary objects directly to the source database system.

Other objects and advantages will be apparent to those skilled in the arts to which the invention pertains upon perusal of the following Detailed Description and drawing, wherein:

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

The following Detailed Description will first describe database replication as it is implemented in the Oracle 8i ® database system to the extent necessary to understand the invention and will then describe the invention itself.

Figure 1:
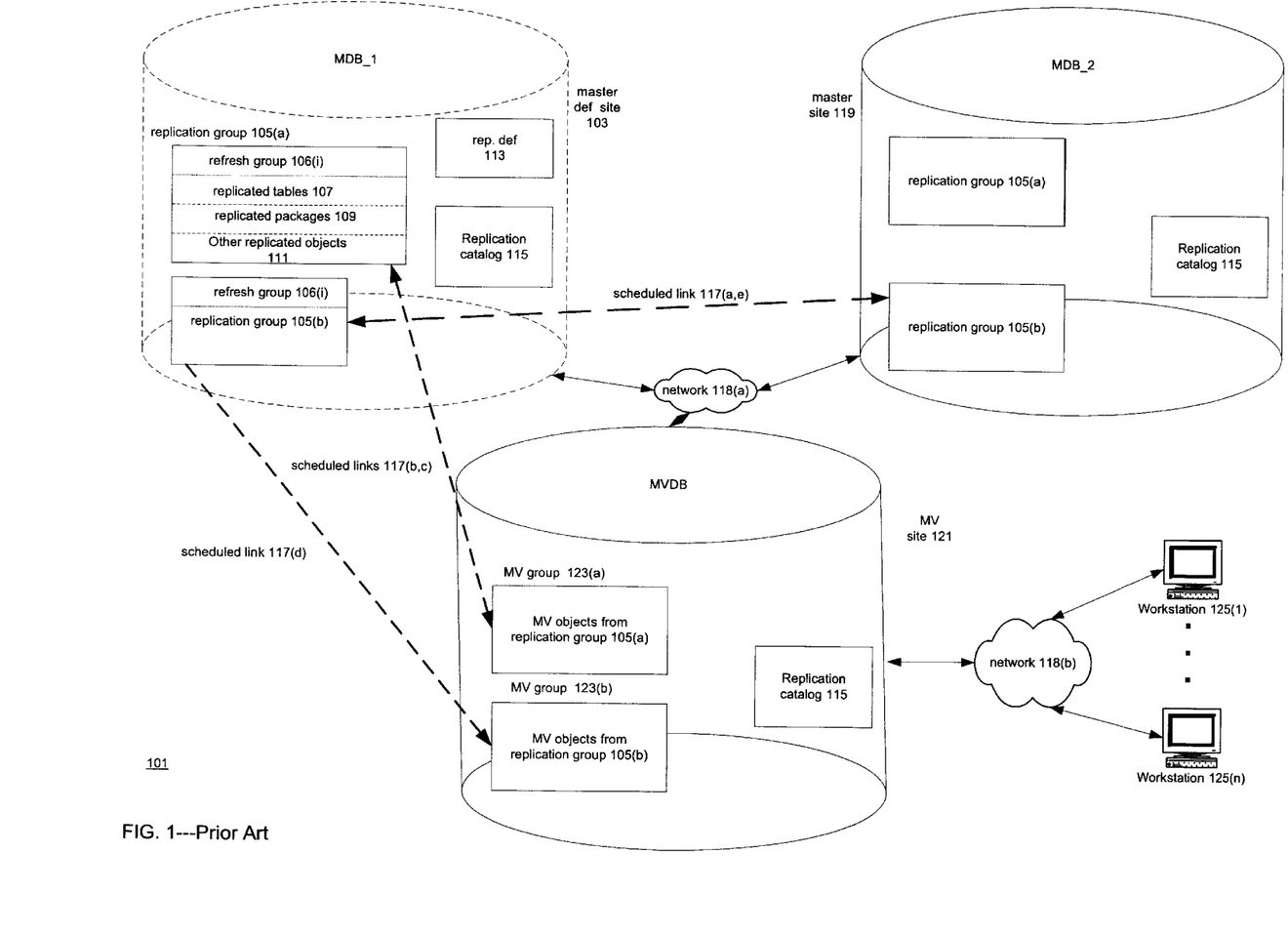
FIG. 1 is a block diagram of a prior-art distributed database system with replication.

Overview of Distributed Data Bases and Replication: FIG. 1

Distributed Databases

A distributed database is a set of databases that appear to an application program as a single database. Database objects are stored in the databases. Among database objects are database tables, packages of procedures that operate on the tables, trigger procedures that are executed in response to changes in the tables, and indexes for the tables. In the Oracle 8i database system, objects are organized into schemas associated with users of the database. The user with which a schema is associated is termed the owner of the database objects in the schema. An SQL request may reference any of the database objects in the database. When a request references a stored procedure, the database system invokes the stored procedure. FIG. 1 shows a prior-art distributed database 101. Three databases, 103, 119, and 121, contain information which is used by applications running on a workstation 125(*i*). The databases exchange information among themselves via network 118(*a*); workstation 125(*i*), along with a number of other workstations, has access to database 121 via network 118(*b*). In a typical configuration, network 118(*a*) may be an intranet belonging to the organization to which the three databases belong. Database 121 may be located at a server that responds to the World Wide Web protocols, network 118(*b*) may be the Internet, and workstation 125(*i*) may be executing a Web browser program. In such a configuration, the user of workstation 125(*i*) provides the server with information that the server uses to make an SQL request to be executed in database 121. The server then incorporates the results of the request in a Web page which it returns to workstation 125(*i*).

When references are made to objects in distributed database 101, the reference must specify not only the object within a database, but also the database itself. Thus, a reference to an object contained in database 103 must employ the name of that database, MDB_1, as part of the reference. References that include the name of the database that contains the object are called global references. The totality of possible global references make up the global name space of the distributed database 101.

A database that belongs to a distributed database may refer to an object in another of the databases in the distributed database by means of a link. A link is a pointer in one database to an object in another. The pointer includes the global name of the object in the other database. A reference made via a link further contains sufficient information about the source of the reference so that the database that includes the object can determine whether to grant access to the object. There are two kinds of links:

A redirection link replaces an object in one database of a distributed database system with a reference to another database of the system that contains the object. The database with the link uses the link to redirect the reference to the other database.

A scheduled link is used to keep copies of objects in different ones of the databases consistent with one another. Scheduled links will be explained in detail below.

Replication

Replication is the process of copying and maintaining database objects in multiple databases that make up a distributed database system. The objects that are copied and maintained are termed replicated objects. When a replicated object is modified in one of the databases, the modification is captured and stored locally before being forwarded and applied at each of the other databases. Systems 103, 119, and 121 contain replicated objects and are termed replication sites. There are two basic kinds of replication: multimaster replication and materialized view replication. Replication may further be done synchronously, i.e., modifications are propagated to the other replication sites substantially when they are made, or asynchronously, i.e., the modifications are propagated at some later time.

Multimaster replication is done in database systems that are master replication sites. There are two such sites in FIG. 1, site 103 and site 119. Each of these master replication sites contains copies of all of the database objects in two replication groups 105(*a*) and 105(*b*). The objects in the replicated groups are the replicated objects in the database. In each database system, replication catalog 115 specifies the replicated objects and the groups they belong to. Included in replication catalog 115 are scheduled links 117 between the replicated objects in the replication groups. Double-ended arrows indicate a link in each direction. The scheduled links define how updates are propagated between the replicated objects so that the objects belonging to the replication groups in the master replication sites remain consistent. When the link specifies a synchronous update, the update is propagated as soon as it is made; when the link specifies an asynchronous update, the updates are propagated in batches. Database system 103 is further a master definition site, which serves as a control point for replication in all three of the database systems of system 101. Replication definition 113 contains the information which master definition site 103 needs to control replication in system 101.

Materialized view site 121 differs from master sites 103 and 119 in that it contains materialized view groups instead of replication groups. A materialized view group may contain fewer than all of the objects in a replication group 105. In addition, a table in a materialized view group may contain less than all of the data in the corresponding object in the master site or may include material from several tables in the master site. Such tables are generally termed views. In many cases, there is no actual table in the database system corresponding to a view; when a query specifies a view, the data specified by the query on the view is simply retrieved from the tables upon which the view is defined. A table that actually exists in the database system is termed a base table. There are situations in which an independent table corresponding to a view is produced and included in the database. Such tables are termed materialized views. Materialized view site 121 is so called because its database stands in the same relationship to the database in its master site 103 as a view stands to its base tables and because tables corresponding to the views on base tables in master site 103 that are included in site 121 really exist in site 121.

Thus, materialized view group 123(*a*) contains objects from replication group 105(*a*), while materialized view group 123(*b*) contains objects from replication group 105 (*b*). An object that belongs to a materialized view group is termed herein a materialized view object. Materialized view objects may be read-only or they may be updateable. In the former case, changes made in an object in a master site that corresponds to an object in a materialized view group are propagated to the materialized view group, but no changes can be made in an object in the materialized view group by an SQL request directed to the materialized view group.

When a materialized view object is updateable, changes made in the materialized view object are propagated to the corresponding object in the replication group corresponding to the materialized view group, and if there are other master sites, to the corresponding objects in the replication groups in those sites. Propagation of changes made in the materialized view object is as described generally for master sites. Propagation of changes from the master site to the materialized view are always done in batch mode. A given propagation of changes from the master site to the materialized view is termed a refresh of the materialized view. Refresh groups 106 for the materialized view may be specified in replication catalog 115. A refresh group may include objects from more than one replication group, as shown by refresh group 106(*i*) in master site 103. Refreshing is done by materialized view. There are two kinds of refresh:

a complete refresh refreshes all of the data in a materialized view at once.

a fast refresh merely refreshes all of the data in the materialized view which has changed since the last refresh.

The Oracle 8i system can be set to automatically perform a complete refresh when a fast refresh fails. Such a complete refresh is called a force refresh.

A major problem for the database administrator who is in charge of a distributed data base system that includes a materialized view is making sure that the materialized view database contains copies of all of the database objects that are referred to by the application programs using the materialized view. For example, if the application program calls a stored procedure and the stored procedure is not in the materialized view database, the call will fail. In order to properly design a materialized view database, the database administrator must not only understand the relationships between the tables that are being replicated in the materialized view, but also understand how these tables are queried by the application programs and what other objects the application program requires. Once the database administrator has obtained a correct design, the administrator can make a template that specifies the database objects that are required for the materialized view database and the materialized view database can use the template to copy the required objects from its master database.

Figure 2:
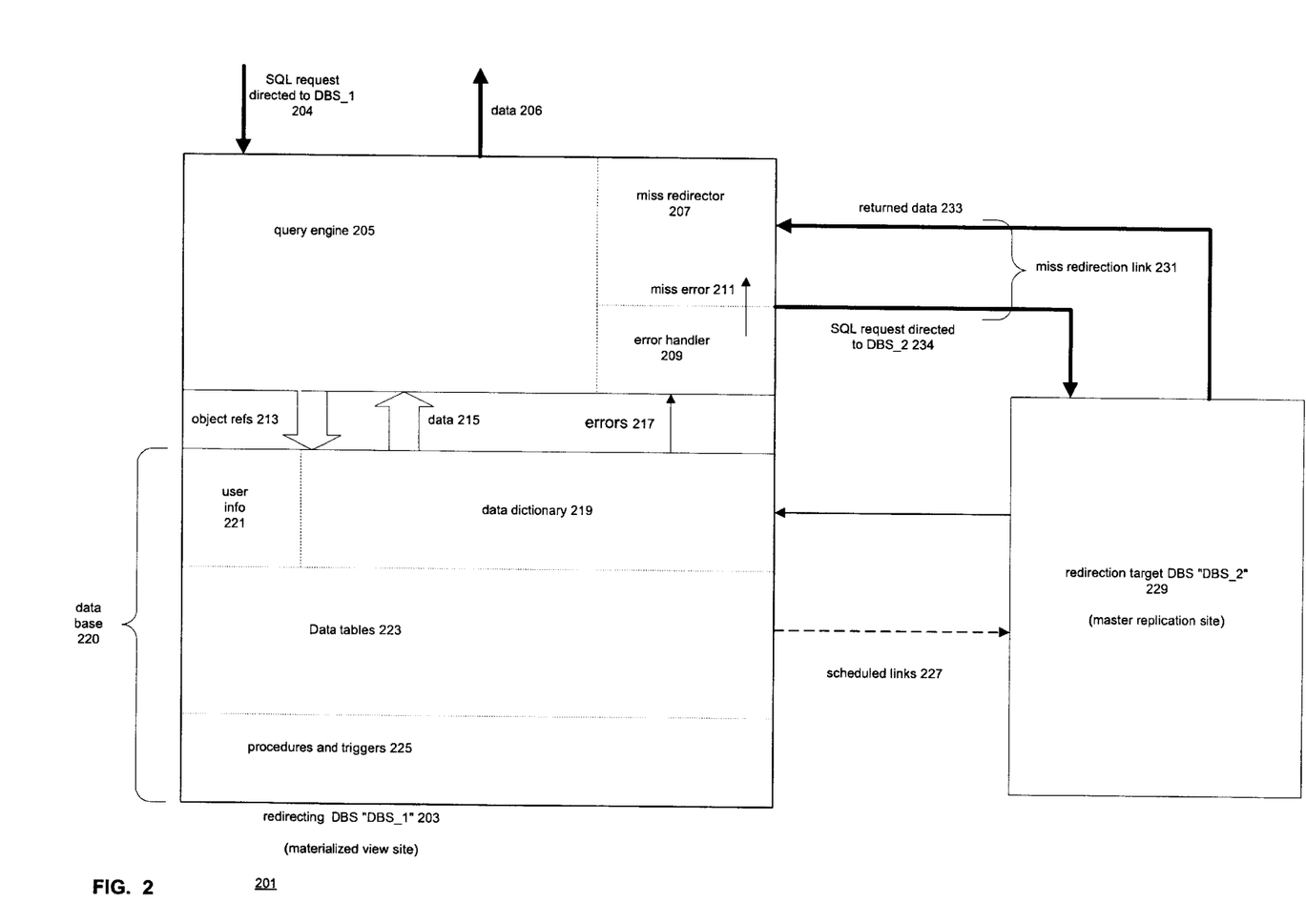
FIG. 2 is a block diagram of a distributed database system with replication in which a first database in the system that does not have a database object referred to in a request to which the first database responds redirects the request to a second database in the system.

A system like system 101 may of course have any number of master sites and a master site may have any number of replication groups. There may also be any number of materialized view sites 121, but each materialized view site 121 must obtain its materialized view objects from a particular one of the master sites. Other embodiments may permit materialized view sites 101 to have materialized view objects from replication groups in more than one master site. Modifying a distributed database system with a materialized view site so that the materialized view site can function as a queryable cache: FIG. 2

A materialized view site is like a queryable cache in that it responds to SQL requests and moves a subset of the database objects contained in a master site closer to the consumer of the data. It is unlike a queryable cache in that it is not transparent; when a data object is missing in the materialized view site but present in the master site, a SQL request that refers to the data object simply fails, rather than being automatically redirected to the master site. FIG. 2 shows how a distributed database system with a materialized view site can be modified to make the materialized view site function as a queryable cache.

Database system 201 in FIG. 2 includes a redirecting database system 203 which is a modified materialized view site and a redirection target database system 229 which is a master site for redirecting database system 203. Redirecting database system 203 has the global name DBS_1 and redirection target database system 229 has the global name DBS_2. At the highest level, database system 201 operates as follows:

1. Database system 203 receives an SQL request 204;
2. Database system 203 attempts to execute the SQL request; as part of executing the SQL request, database system 203 parses the request. As part of parsing the request, database system 203 resolves references in the request to database objects; if all of the references can be resolved, the request can be executed in database system 203 and database system 203 executes the request and returns the data 206 resulting from the execution to the source of the SQL request;
3. If any of the references cannot be resolved or parsing fails for other reasons, for example, if the user does not have the appropriate privileges on an object, a miss has occurred and database system 203 redirects part or all of the SQL request to database system 229, as shown by arrow 231;
4. Database system 229 executes the redirected portion of the SQL request and returns the results to database system 203 (arrow 233), which integrates it with any part of the results obtained in database system 203 and returns the complete results 206 to the source of SQL request 204.

Database system 201 differs from the system disclosed in WO 00/63800, Cusson, et al., Web servers with queryable dynamic caches, in that the redirection is done within database system 203, not in the data access layer. It should further be pointed out here that the techniques of database system 201 only require that all of the references in the request received in database system 203 be resolvable in one or another of a set of database systems that either themselves redirect SQL requests or are reachable by redirection from database systems that do, with all of the databases in the set being reachable either directly or indirectly by a redirection that begins from database system 203.

Continuing in more detail with database system 203, like all database systems, database system 203 includes a query engine 205 and a database 220. Query engine 205 resolves the references in SQL requests and performs the operations specified for the references on the objects specified by the references, as indicated by arrow 213. The results of the operations are returned to query engine 205, as shown by arrow 215. Database 220 has two main components: tables 223 and procedures and triggers 225. The procedures and triggers are stored programs that are executable by query engine 205. A procedure is executed when an SQL request includes a reference to the procedure; triggers are associated with other database objects and are executed when a condition under which the trigger is to be executed arises with regard to an object with which the trigger is associated. The tables include data dictionary 219, user information 221, and user tables 223. As its name implies, data dictionary 219 is a set of tables that describes all of the objects in the database system. User information 221 is tables that contain information about users of the system.

As with a standard materialized view site, database system 203 is connected by scheduled links 227 to redirection target database system 229. If database system 203 contains only read-only objects, then the only scheduled link needed is one (solid line) that provides for any necessary propagation of changes in database system 229's objects that have copies in database system 203 to database system 203. If database system 203 contains updateable objects, then there is a scheduled link (dashed line) that provides for propagation of the updates of these objects to database system 229.

Database system 203 has been modified from a standard materialized view site to enable redirection as follows:
- a miss redirection link 231 has been established between database system 203 and database system 209;
- code for a miss redirector 207 has been added to query engine 205.

Continuing in more detail with miss redirection link 231, miss redirection link 231 is a generalized mechanism for transferring an SQL request or a portion thereof from one database system to another. It therefore does not connect a representation of an object in one database to the object itself in another, but rather one database to another. Because it is a generalized mechanism, it can be used to transfer an SQL request when there is a miss. The redirection links used in distributed database system 101, by contrast, simply permit a reference in an SQL request to be resolved not to the data itself, but rather to a specification of another database where the data may be found. Because this is the case, a miss will not occur where there is a standard redirection link and consequently, standard redirection links cannot be used to deal with misses.

With regard to miss redirector 207, an error handler 209 is a standard component of database systems. When an error occurs while the database system is dealing with an SQL request, for example, the request contains a reference to an object that is not in the database system, the database system produces an error message that identifies the error. Error handler 209 handles the error, generally by examining the error message and invoking a function that deals with the error. In database system 203, the function that handles errors resulting from misses is miss redirector 207, which takes either the entire SQL request or the portion of the request that caused the miss and redirects it via miss redirection link 231 to redirection target database 229, as shown at 234. When the result of the redirected request or portion is returned via link 231, as shown at 233, miss redirector 207 provides the result to query engine 205 for inclusion with whatever results were obtained locally. In a preferred embodiment, the database system employs an exception handling mechanism: an exception handler is defined for a particular set of errors and when an error occurs, the query engine raises an exception that specifies the error and invokes the exception handler; in the preferred embodiment, if the error is a miss, the exception handler then invokes miss redirector 207.

Simplifying Instantiation of Objects in a Materialized View Site 121

A problem with any database system in a distributed database system whose database contains a partial copy of another database is making the initial partial copy. In the relevant technologies, the process of making the partial copy is termed instantiating the partial copy and the partial copy itself is termed an instantiation. The initial partial copy must contain not only the desired data tables, but also all objects from the source database system that are required for SQL requests involving the desired data tables to work properly. Such objects are termed herein dependent objects. Examples of dependent objects are the data dictionary entries for the data tables, schema objects for the users that are to use the desired data tables, indexes for the desired tables, and objects that define access privileges for users included in the portion.

The following discussion will first give an overview of the techniques previously used in Oracle 8i® database systems to instantiate partial copies of databases and will then describe a technique which overcomes the problems of the previous techniques. The technique is employed to instantiate the partial copy of the database in redirection target DBS 229 in redirecting database 203, but it can be used anywhere else where a partial copy needs to be instantiated, for example in a materialized view site 121.

Instantiation of Objects in System 101

In system 101, there are two methods for instantiating objects in a partial copy. When what is being instantiated is an entire database or entire base tables, objects may be instantiated using Oracle's IMPORT and EXPORT functions; where objects are instantiated in a partial copy with materialized views, instantiation is by means of a deployment template. Beginning with the deployment template, a deployment template is a blueprint for creating the materialized views in the partial copy and the dependent objects for those materialized views. The deployment template is defined in a master site 119 and is stored in the master site's data dictionary 219. How the deployment template is used depends on whether the objects to be instantiated in materialized view site 121 are copied across the network from the master site 119 or are copied onto media that are provided to materialized view site 121. In the first case, an administrator (often the user) of materialized view site 121 logs onto master site 119 via the network and selects the desired deployment template from a list. Master site 119 then uses the deployment template to select the objects to be copied and copies them across the network to materialized view site 121. In the second case, a copy of the deployment template and of a program that can interpret it are included on the media and the administrator of materialized view site 121 executes the program. The program uses the deployment template to copy the objects on the media to materialized view site 121. For details on deployment templates, see Oracle 8i replication, Release 8.1.5, part number A67791-01, available in June, 2001 at http://technet.oracle.com/doc/server.815/a67791/ch5.htm or from Oracle Corporation.

While deployment templates work for their intended purpose, they have two drawbacks:
- The deployment template as written must include descriptions of all of the tables or views required for the materialized view and all dependant objects for those tables or views.
- The deployment template uses the SQL data definition language (DDL) to describe the objects.

Making deployment templates in system 101 is thus nearly exclusively the province of an expert database administrator who works in master site 119. Only such a person has the skill and knowledge first to figure out the dependencies between objects in master site 119 and second to write the deployment template. An idea of what is required can be seen from the following example, which shows an invocation of the CREATE_TEMPLATE OBJECT function that adds a description of an object to a template:

```
DECLARE
    a NUMBER;
BEGIN
    a := DBMS_REPCAT_RGT.CREATE_TEMPLATE_OBJECT(
        refresh_template_name => 'dt_snapenv',
        object_name = 'foo_snap',
        object_type => 'snapshot',
        ddl_text => 'CREATE SNAPSHOT foo_snap AS
            SELECT empid, region, dept, salary
            FROM scott.foo@hq.com');
END;
```

The above specifies that the object is to be added to the template named 'dt_snapenv', that its name in that environment is 'foo_snap', that its object type is 'snapshot' (materialized view), and that foo_snap is to be created according to the DDL description following ddl_text=>. The DDL description specifies that the foo_snap is made from the columns empid, region, dept, and salary of the table foo belonging to the user scott in the database at the location hq. com.

IMPORT and EXPORT are simpler to use, but are limited to base tables or entire databases. When given a list of base table names in a database, EXPORT uses the data dictionary to locate the base tables and all objects dependent on the tables and makes a dump file of them in a proprietary format. IMPORT can read this file, and one can thus instantiate copies of base tables in one database in another database by doing EXPORT to create the dump file for the tables and their dependent objects, making the file available to the other database, and using IMPORT in the other database to read the dump file and instantiate the tables and their dependent objects.

Making Object Instantiation Easier

In system 201, the arrangements for instantiating objects from target DBS 229 in redirecting DBS 203 have been improved as follows:

A new materialized view template has been introduced that requires only that the person making the template know object names and types and obvious dependencies;

The instantiation process is done in the back end. It makes any modifications in the back end that are necessary for redirecting DBS 203 and produces a list of objects for EXPORT. EXPORT makes a dump file for those objects and any dependent objects, and DBS 203 uses IMPORT to instantiate the objects.

The person making the new materialized view template thus need have no detailed knowledge of the dependencies of objects in target database 229 or of the SQL data definition language.

Figure 3:
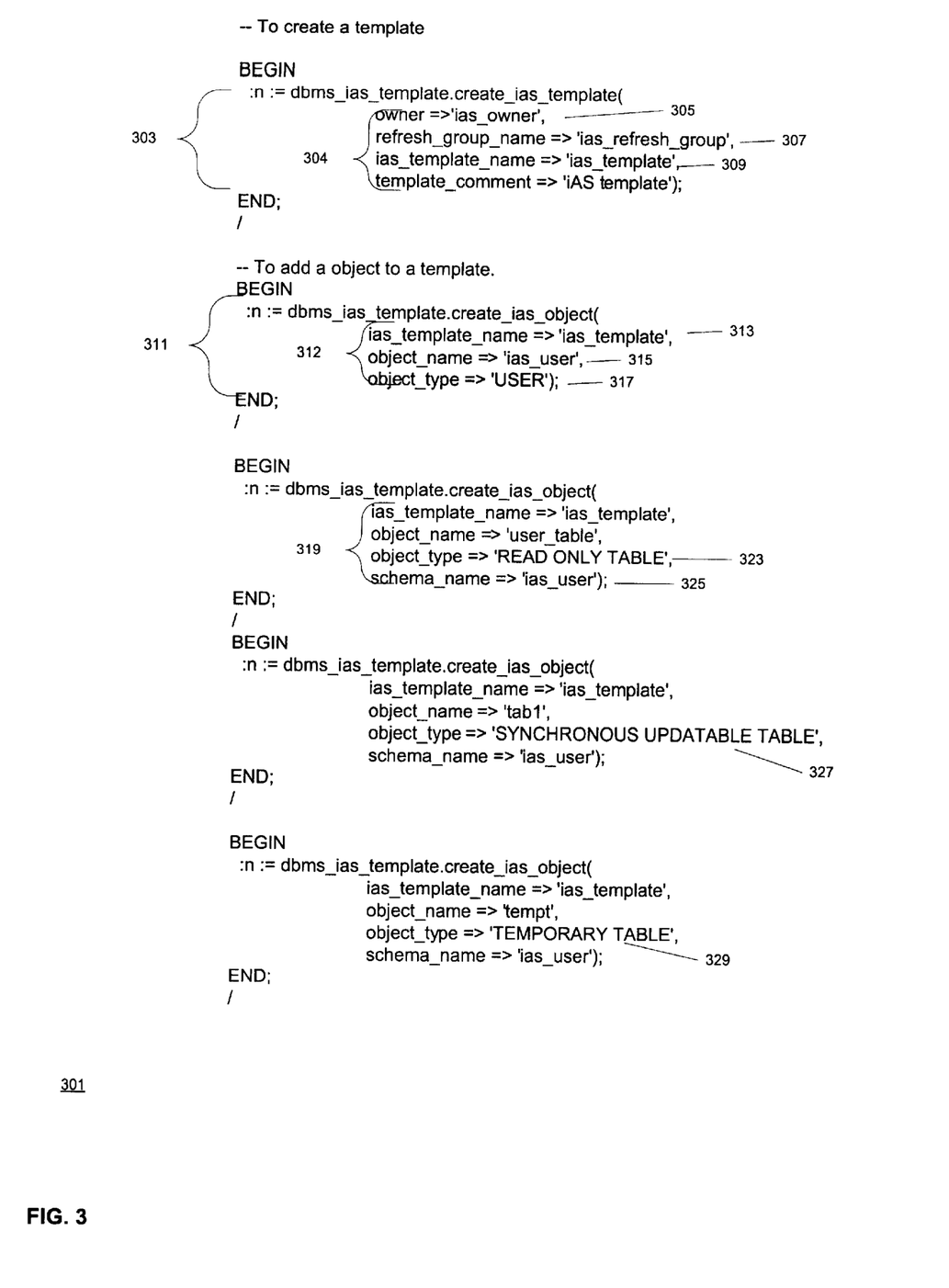
FIG. 3 shows how objects to be included in a materialized view site are specified.

Creating the Materialized View Template: FIG. 3

FIG. 3 shows invocations of the functions 301 used to create a materialized view template in a presently-preferred embodiment and their use with a variety of objects. The first invocation 303 is of create_ias_template, which creates a materialized view template. To create a template, one specifies the owner of the template (305), a name for the refresh group 106 that the objects specified in the template will belong to (307), and a name for the template (309). The rest of the code is invocations of the create_ias_object function 311, which is invoked each time an object is to be added to a materialized view template. Here, the object being added is the object that represents the user to whose schema the objects will belong in redirecting DBS 203. Arguments 312 specified in the invocation are the name of the template to which the object is being added (313), the name of the object (315), and the type of the object in redirecting DBS 203 (317), here USER.

At 319 are shown the arguments used with most objects. As before, there are the template name, the object name, and the object's type in redirection DBS 203; here the type specifies that the object is READ ONLY (323). In addition, there is an argument that specifies the schema to which the object belongs (325). Other object types in code 301 include SYNCHRONOUS UPDATABLE TABLE and TEMPORARY TABLE. The former specifies that the table is updatable in redirecting DBS 203 and that any updates will be provided to redirection target DBS 229 as they are made. The latter specifies that that table is a temporary table and will be placed in a temporary segment belonging to the user. The temporary table may contain either session-specific or transaction-specific data.

In FIG. 3, the information used to specify the objects is supplied directly to the functions as arguments; in a more usual implementation, the user specifying the objects would provide the arguments using an interactive user interface and the application that received the arguments from the interactive user interface would use them to invoke the functions. One example of such an interactive user interface is a Web browser. In such a system, the user would receive a Web page in the browser into which the user could write the argument values, and an application that received the values from the Web page would use them to invoke the functions of FIG. 3.

Figure 4:
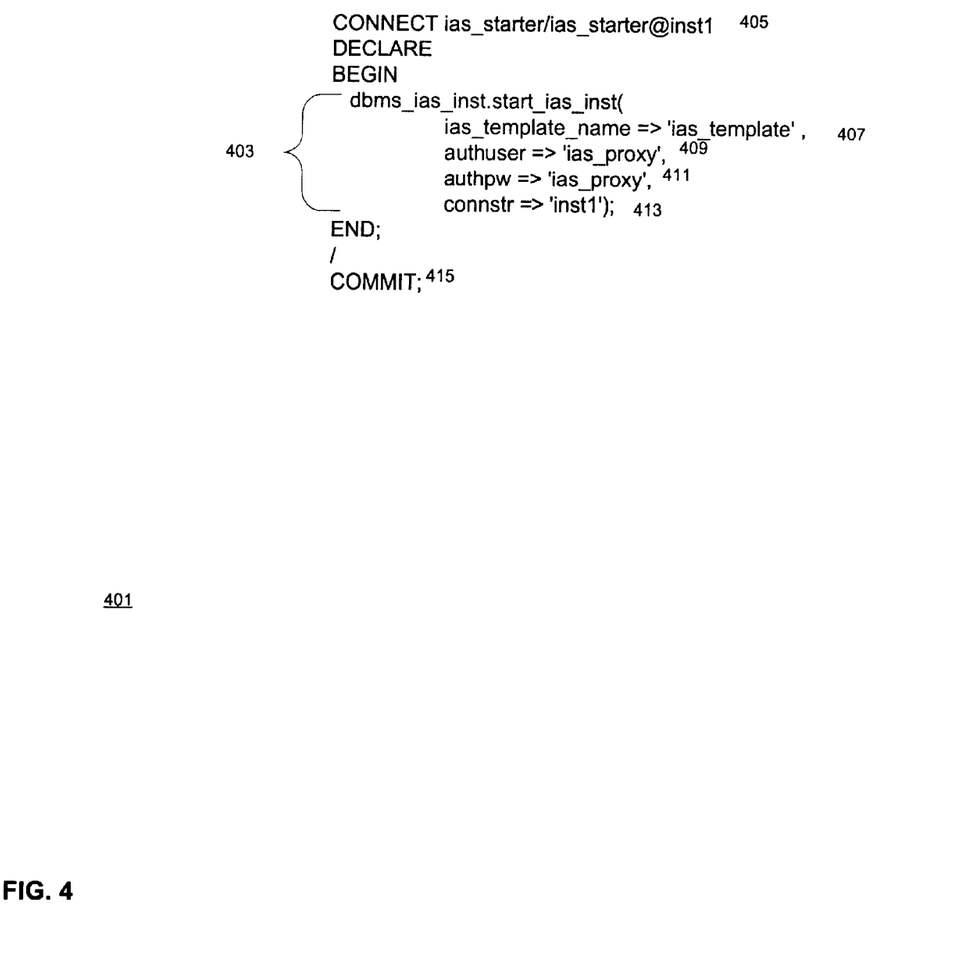
FIG. 4 shows an invocation of a function that instantiates objects in a materialized view site.

Instantiating the Objects Specified in the Materialized View Template: FIG. 4

FIG. 4 shows an example of PL/SQL code 401 which uses EXPORT to make a dump file of the objects specified in a materialized view template, and sets up redirection target DBS 229 so that redirecting DBS 203 can act as DBS 229's proxy for user authentication purposes. In redirecting DBS 203, the dump file will be read by the IMPORT utility to actually instantiates the objects specified in the materialized view template.

The start_ias_inst function invoked at 403 does the work; its arguments specify the materialized view template that will be used at 407, the user name 409 and password 411 for the authentication proxy in redirecting DBS 203, and the network connection that miss redirection link 231 will use (413). When function invocation 403 is executed, an EXPORT dump file will be created. What start_ias_inst does will be described in more detail in the discussion of FIG. 5 below.

Figure 5:
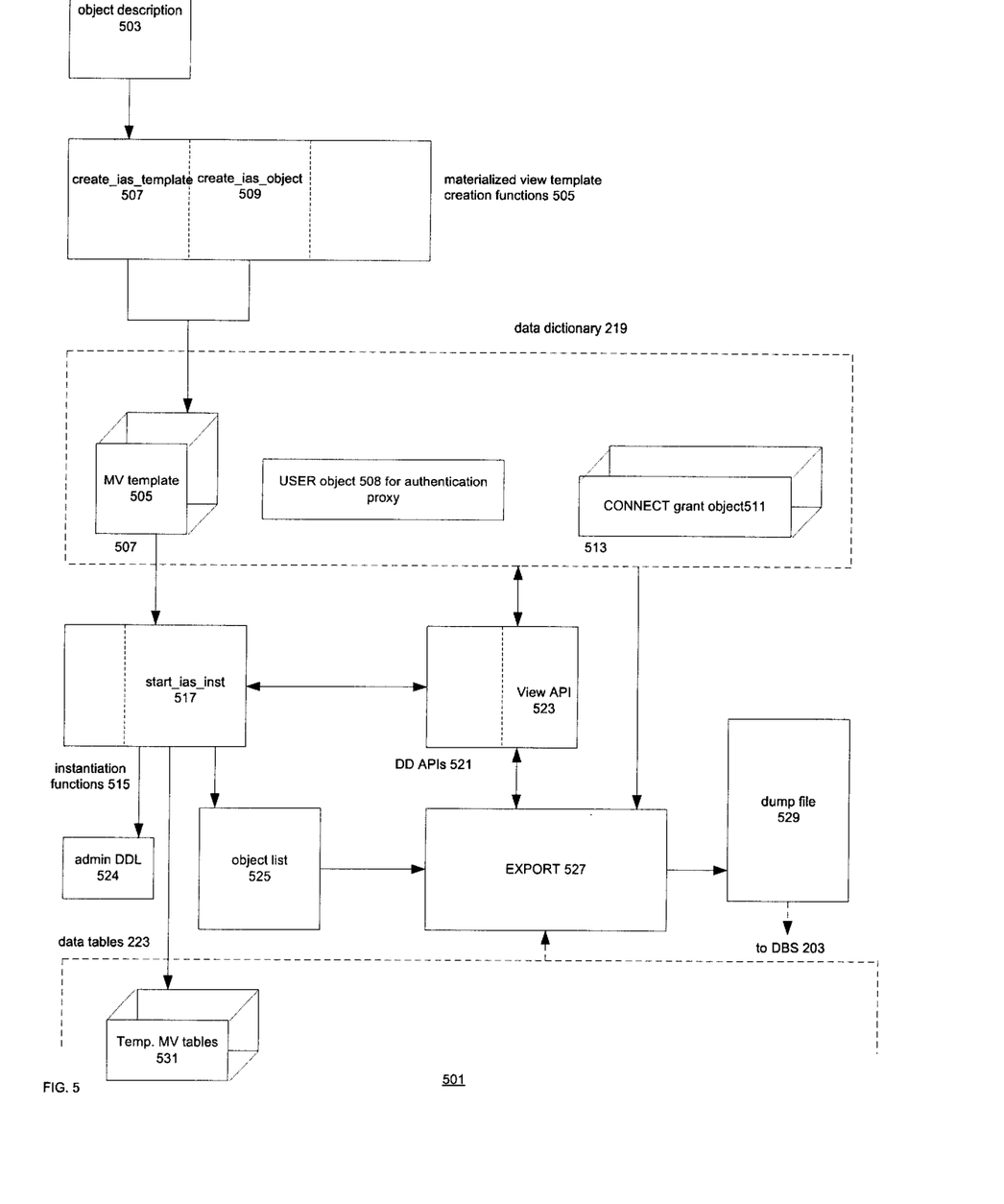
FIG. 5 shows the components of redirection target database system 229 that are used to instantiate objects in redirecting database system 203.

Object Instantiation in Redirection Target Database 229: FIG. 5

FIG. 5 shows how instantiation is done in a preferred embodiment. Shown in system 501 are data dictionary 219 and data tables 223 of redirection target database 229; the functions used to specify the materialized view template and use the materialized view to instantiate the objects are to be understood to be components of query engine 205.

As previously described, the first step in instantiation is to make a materialized view template by providing template and object descriptions 503 to materialized view creation functions 505; two of the functions are shown, create_ias_template 507 and create_ias_object 509. As already explained, these functions create or add objects to a materialized view template 505. A number of such templates 507 may be stored in data dictionary 219.

When it is time to instantiate the materialized view specified by a particular materialized view template 505, the person doing the instantiation uses start_ias_inst function 517, which, as indicated above, takes the materialized view template's name, the user name and password for the authentication proxy in redirecting DBS 203, and the physical connection that will be used for redirection link 231. start_ias_inst 239 does a number of things:

- it makes temporary materialized view tables 531 for tables in redirecting DBS 203 that correspond to views of base tables in redirection target DBS 229;
- it makes a SPL DDL specification of the objects needed to administer the instantiation in redirecting DBS 203;
- it sets up the objects required for miss redirection link 231 in redirection target DBS 229;
- it makes a list of the objects belonging to the schema of each user specified in the materialized view template and provides the list to EXPORT 527.

Each of these operations will be described in more detail in the following. In performing the operations, start_ias_inst 517 uses functions in data dictionary APIs 521 to obtain the necessary information to make object list 525 and temporary MV tables 531. Particularly important among these functions are the ones belonging to View API 523, which permits various views of the information in data dictionary 219.

The temporary materialized views 531 are necessary because EXPORT exports only base tables; thus, if it is to export a table to redirecting database system 203 that corresponds to a view in database system 229, there must be an actual table in database system 229 that corresponds to the view. The table may be deleted in database system 229 after dump file 529 has been imported. The last thing the IMPORT utility does is a fast refresh on the copies of the base tables and materialized views.

Adminstrative DDL 524 simply specifies the objects that must be present in redirecting database system 203 to administer the instantiation. Included here is DDL for the shared link objects in redirecting database system 203 for redirection link 231. Administrative DDL 524 is included in the objects provided to EXPORT 527.

The objects required for miss redirection link 231 in data dictionary 219 are the following:

- a USER object for the authentication proxy; and
- a CONNECT grant object for every user specified in the materialized view template; in each of these objects, the grant is via the authentication proxy.

Setting up miss redirection link 231 with the shared link objects produced in redirecting DBS 203 by DDL 504 and with the above objects makes it possible for the authentication proxy in redirecting DBS 203 to request that redirection target DBS 229 create a session for performing redirected operations for a user of DBS 203 without providing the user's password to redirection target DBS 229. The password is not necessary because the authentication proxy authenticates the user to redirection target DBS 229.

The list of objects 525 is the list that EXPORT will use to make dump file 529. From EXPORT's point of view, the list is no different from any other list of objects; however, start_ias_inst 517 makes the list from the point of view of the users specified in the materialized view template or a previously instantiated template. The principle for selecting objects to be copied is this: an object from redirection target DBS 229 is automatically included among the objects that will have copies in redirecting DBS 203 if the object's owner is already or will be copied to DBS 203 and the underlying table is already or will be copied to DBS 203.

The dumpfile 529 produced by EXPORT contains the objects listed in object list 529, all of the objects dependent on those objects, and administrative DDL 524. Redirecting DBS 203 can retrieve dumpfile 529 and use the IMPORT utility to produce a complete instantiation of the subset of objects from redirection target DBS 229 that are cached in redirection DBS 203. Since start_ias_inst 517 also set up the objects for the authentication proxy and miss redirection link 231, once IMPORT has produced the instantiation, redirecting DBS 203 is ready to function as a queryable cache. Of course, the techniques described here could be used to instantiate the objects in any MV site 121. In this case, however, it would not be necessary to create the objects in redirecting DBS 203 or redirection target DBS 229 that are needed to set up miss redirection link 231 and the authentication proxy.

Conclusion

The foregoing Detailed Description has disclosed to those skilled in the relevant technologies how to implement and use the inventors' techniques for simplifying copying of objects from one database system in a distributed database system to another and ensuring that the infrastructure necessary for the distributed database system is present. The Detailed Description has further disclosed the best mode presently known to the inventors of implementing their techniques. It will be immediately apparent to those skilled in the relevant technologies that there are many ways of implementing the principles of the invention. In particular, the implementation disclosed herein is in an Oracle 8i distributed database system and many of the details of the implementation are dictated by characteristics of the Oracle 8i system. That is particularly the case with regard to issues like the manner in which the objects are organized in the database, the dependencies among them, the manner in which infrastructure such as links and privileges are set up, and the manner in which authentication of links is done. Thus, whenever a description particular to the implementation of the techniques in the Oracle 8i system is given, that description should be read as including equivalent structures and techniques in database systems made by other manufacturers.

For all of the foregoing reasons, the Detailed Description is to be regarded as being in all respects exemplary and not restrictive, and the breadth of the invention disclosed here in is to be determined not from the Detailed Description, but rather from the claims as interpreted with the full breadth permitted by the patent laws.

What is claimed is:

1. Apparatus for selecting objects to be copied from objects in a database system, the objects in the database system including at least database tables and being organized into a schema associated with a user of the database system and the apparatus comprising:
- a template creator that receives one or more object descriptions and produces a template therefrom; and
- an object selector that receives the template and makes a list of objects therefrom, the list of objects including the objects described in the template and other objects that belong to the described objects' schema and are dependent from a table object in the list that belongs to the described objects' schema.

2. The apparatus set forth in claim 1 wherein:
the object description does not include a DDL specification of the object.

3. The apparatus set forth in claim 2 wherein:
the object description includes specifications of the object's name, type, and schema.

4. The apparatus set forth in claim 1 wherein:
the list of objects is in a form such that an export utility can make a dump file of at least the objects on the list.

5. The apparatus set forth in claim 4 wherein:
the export utility further includes objects that are dependent on the objects on the list in the dump file.

6. The apparatus set forth in claim 1 wherein:
the copied objects will be incorporated into another database system; and
the object selector further makes an object that includes information needed to set up the copied objects in the other database system and includes the made object in the list.

7. The apparatus set forth in claim 6 wherein:
the database system and the other database system belong to a distributed database system; and
the made object specifies at least a link between the database system and the other database system.

8. The apparatus set forth in claim 7 wherein:
the made object further specifies an additional user in the other database system that is a user of the link.

9. The apparatus set forth in claim 8 wherein:
the object selector further makes objects in the database system including a user object for the additional user and a grant object that grants the additional user a privilege in the database.

10. The apparatus set forth in claim 9 wherein:
the additional user is an authentication proxy that authenticates a user in the other database system to the database system and the grant object grants the authentication proxy a connection privilege.

11. The apparatus set forth in claim 1 wherein:
the copied objects will be incorporated into another database system that is a cache with regard to the database system.

12. The apparatus set forth in claim 11 wherein:
the object selector further makes an object that includes information needed in the other database system to establish a miss redirection link between the other database system and the database system and includes the made object in the list.

13. The apparatus set forth in claim 12 wherein:
the made object further includes information needed in the other database to establish an authentication proxy for the redirection link in the other database and
the object selector further makes a grant object in the database system that grants the authentication proxy a connect privilege in the database system.

14. Apparatus for providing a first database system and a second database system with objects necessary to make the first database system a cache of the second database system, the apparatus comprising:
an object selector, the object selector selecting objects from the second database system that are to have copies in the first database system and making a list of the selected objects, the object selector further making an object that contains information necessary in the first database system to establish a miss redirection link between the first database system and the second database system and adding the made object to the list and
an exporter that makes a file from at least the objects on the list that can be used to instantiate the objects on the list in the first database system.

15. The apparatus set forth in claim 14 wherein:
the object selector further makes an object in the second database system that is necessary to establish the miss redirection link.

16. A method of selecting objects to be copied from objects in a database system, the objects in the database system including at least database tables and being organized into a schema associated with a user of the database system,
the method comprising the steps performed in the database system of:
producing a template from one or more object descriptions; and
making a list of objects from the template, the list of objects including the objects described in the template and other objects that belong to the described objects' schema and are dependent from a table object in the list that belongs to the described objects' schema.

17. The method set forth in claim 16 wherein:
in the step of producing a template, the object description does not include a DDL specification of the object.

18. The method set forth in claim 17 wherein:
in the step of producing a template, the object description includes specifications of the object's name, type, and schema.

19. A data storage device characterized in that:
the data storage device contains code which when executed by a processor performs the method set forth in claim 18.

20. A data storage device characterized in that:
the data storage device contains code which when executed by a processor performs the method set forth in claim 17.

21. The method set forth in claim 16 wherein:
in the step of making a list, the list of objects is in a form such that an export utility can make a dump file of at least the objects on the list.

22. The method set forth in claim 21 wherein:
in the step of making a list, the export utility further includes objects that are dependent on the objects on the list in the dump file.

23. A data storage device characterized in that:
the data storage device contains code which when executed by a processor performs the method set forth in claim 22.

24. A data storage device characterized in that:
the data storage device contains code which when executed by a processor performs the method set forth in claim 21.

25. The method set forth in claim 16 wherein
the copied objects will be incorporated into another database system; and
the method further comprises the step of:
making an object that includes information needed to set up the copied objects in the other database system and including the made object in the list.

26. The method set forth in claim 25 wherein:
the database system and the other database system belong to a distributed database system; and
in the step of making the object, the made object specifies at least a link between the database system and the other database system.

27. The method set forth in claim 26 wherein:
in the step of making the object, the made object further specifies an additional user in the other database system that is a user of the link.

28. The method set forth in claim 27 wherein:

the step of making the object further includes making objects in the database system including a user object for the additional user and a grant object that grants the additional user a privilege in the database.

29. The method set forth in claim 28 wherein:

in the step of making the object, the additional user is an authentication proxy that authenticates a user in the other database system to the database system and the grant object grants the authentication proxy a connection privilege.

30. A data storage device characterized in that:

the data storage device contains code which when executed by a processor performs the method set forth in claim 29.

31. A data storage device characterized in that:

the data storage device contains code which when executed by a processor performs the method set forth in claim 26.

32. A data storage device characterized in that:

the data storage device contains code which when executed by a processor performs the method set forth in claim 27.

33. A data storage device characterized in that:

the data storage device contains code which when executed by a processor performs the method set forth in claim 28.

34. A data storage device characterized in that:

the data storage device contains code which when executed by a processor performs the method set forth in claim 25.

35. The method set forth in claim 16 wherein:

in the step of making a list, the copied objects will be incorporated into another database system that is a cache with regard to the database system.

36. The method set forth in claim 35 wherein:

the step of making an object further includes making an object that includes information needed in the other database system to establish a miss redirection link between the other database system and the database system and includes the made object in the list.

37. The method set forth in claim 36 wherein:

the made object further includes information needed in the other database to establish an authentication proxy for the redirection link in the other database; and the step of making the object further includes making a grant object in the database system that grants the authentication proxy a connect privilege in the database system.

38. A data storage device characterized in that:

the data storage device contains code which when executed by a processor performs the method set forth in claim 37.

39. A data storage device characterized in that:

the data storage device contains code which when executed by a processor performs the method set forth in claims 36.

40. A data storage device characterized in that:

the data storage device contains code which when executed by a processor performs the method set forth in claim 35.

41. A data storage device, characterized in that:

the data storage device contains code which when executed by a processor performs the method set forth in claim 16.

\* \* \* \* \*